(12) United States Patent
Kono et al.

(10) Patent No.: US 7,105,619 B2
(45) Date of Patent: *Sep. 12, 2006

(54) FLUORINE-CONTAINING COPOLYMER

(75) Inventors: Hideki Kono, Settsu (JP); Takayuki Hirao, Orangeburg, NY (US); George Lin, Orangeburg, NY (US); Kazuyuki Fukuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 105 days.

This patent is subject to a terminal disclaimer.

(21) Appl. No.: 10/501,548

(22) PCT Filed: Jan. 17, 2003

(86) PCT No.: PCT/JP03/00331

§ 371 (c)(1),
(2), (4) Date: Oct. 7, 2004

(87) PCT Pub. No.: WO03/059970

PCT Pub. Date: Jul. 24, 2003

(65) Prior Publication Data

US 2005/0049375 A1 Mar. 3, 2005

Related U.S. Application Data

(63) Continuation-in-part of application No. 10/046,703, filed on Jan. 17, 2002, now Pat. No. 6,703,464.

(30) Foreign Application Priority Data

Jan. 17, 2002 (US) ................................. 10/046703

(51) Int. Cl.
*C08F 116/12* (2006.01)
(52) U.S. Cl. .......................... 526/247; 526/89; 526/206; 526/247; 526/254
(58) Field of Classification Search ................ 526/247, 526/89, 206, 254
See application file for complete search history.

(56) References Cited

U.S. PATENT DOCUMENTS

| 2,946,763 | A | | 7/1960 | Bro et al. |
| 3,085,083 | A | | 4/1963 | Schreyerr |
| 3,969,435 | A | | 7/1976 | Bailey et al. |
| 4,001,351 | A | | 1/1977 | Roura |
| 4,029,868 | A | * | 6/1977 | Carlson ...................... 526/247 |
| 4,105,716 | A | | 8/1978 | Sakai et al. |
| 4,262,101 | A | * | 4/1981 | Hartwimmer et al. ........ 526/89 |
| 4,546,157 | A | | 10/1985 | Nakagawa et al. |
| 4,552,925 | A | * | 11/1985 | Nakagawa et al. .......... 525/200 |
| 4,587,316 | A | | 5/1986 | Nakagawa et al. |
| H130 | H | | 9/1986 | McDermott et al. |
| 4,626,587 | A | | 12/1986 | Morgan et al. |
| 4,703,095 | A | | 10/1987 | Nakagawa et al. |
| 4,749,752 | A | | 6/1988 | Youlu et al. |
| 5,677,404 | A | | 10/1997 | Blair |
| 5,688,885 | A | | 11/1997 | Blair |
| 5,700,889 | A | | 12/1997 | Blair |
| 5,703,185 | A | * | 12/1997 | Blair ........................... 526/247 |
| 6,489,420 | B1 | * | 12/2002 | Duchesne et al. .......... 526/255 |
| 6,703,464 | B1 | * | 3/2004 | Kono et al. ................. 526/247 |
| 2001/0006727 | A1 | | 7/2001 | Lee et al. |

FOREIGN PATENT DOCUMENTS

| EP | 0 759 446 A1 | 2/1997 |
| EP | 0789038 A1 * | 8/1997 |
| EP | 0 789 038 | 5/2001 |
| EP | 1 262 496 A1 | 12/2002 |
| GB | 1 210 794 | 10/1970 |
| GB | 1 231 333 | 5/1971 |
| GB | 1 316 222 | 5/1973 |
| JP | 49-10290 | 1/1974 |
| JP | 50-115293 | 9/1975 |
| JP | 52-887 | 1/1977 |
| JP | 52-73994 | 6/1977 |
| JP | 58-69213 | 4/1983 |
| JP | 58-69213 A | 4/1983 |
| JP | 59-166516 | 9/1984 |
| JP | 59-166516 A | 9/1984 |
| JP | 62-192411 | 8/1987 |
| JP | 62-192411 A | 8/1987 |
| JP | 2-155907 | 6/1990 |
| JP | 9-52920 | 2/1997 |
| JP | 9-52920 A | 2/1997 |
| JP | 9-202814 | 8/1997 |
| JP | 9-202814 A | 8/1997 |

(Continued)

OTHER PUBLICATIONS

International Search Report for PCT/JP03/00331 dated Apr. 30, 2003.

*Primary Examiner*—David W. Wu
*Assistant Examiner*—Henry S. Hu

(57) ABSTRACT

A fluorine-containing copolymer obtained by copolymerizing tetrafluoroethylene, hexafluoropropylene and perfluoro vinyl ether as component monomers, wherein a weight ratio of tetrafluoroethylene, hexafluoropropylene and perfluoro vinyl ether units constituting the fluorine-containing copolymer is 70 to 95: 5 to 20: 0 to 10, respectively; the fluorine-containing copolymer having: a melt flow rate of 30 (g/10 minutes) or more; a volatile content index of 0.2% by weight or less; and a stress relaxation modulus G(t) (unit: dyn/cm$^2$) which satisfies the following formula at t=0.1 second when measured at a temperature of 310° C.:

$$G(0.1) > 7 \times 10^6 \times X^{-1.62} - 3000$$

where X denotes the melt flow rate (unit: g/10 minutes). Also disclosed is an insulating material composed of the fluorine-containing copolymer and an insulated cable having a core conductor coated with the fluorine-containing copolymer.

9 Claims, No Drawings

FOREIGN PATENT DOCUMENTS

| | | |
|---|---|---|
| JP | 2002-535456 | 10/2002 |
| JP | 2002-535456 A | 10/2002 |
| WO | WO 98/09784 | 3/1998 |
| WO | WO 00/44797 | 8/2000 |
| WO | WO 01/18076 | 3/2001 |
| WO | WO 01/19582 | 3/2001 |
| WO | WO 01/36504 A1 | 5/2001 |
| WO | WO-03/059970 A1 * | 7/2003 |

* cited by examiner

FLUORINE-CONTAINING COPOLYMER

CROSS REFERENCE TO RELATED APPLICATIONS

This application is a continuation-in-part of U.S. application Ser. No. 10/046,703 filed on Jan. 17, 2002, now U.S. Pat. No. 6,703,464, the disclosure of which is incorporated herein by reference.

TECHNICAL FIELD

The present invention relates to a fluorine-containing copolymer which improves extrusion moldability for coating an electric cable with an insulating resin and which is capable of suppressing the occurrence of molding faults over long term operation even when coating at high speed.

BACKGROUND ART

Tetrafluoroethylene (TFE)/hexafluoropropylene (HFP) copolymer has superior heat resistance, chemical resistance, extrusion moldability and the like, and in addition, has superior electric insulating property and high-frequency property with a low dielectric tangent. Therefore, it is used for insulating cable such as a cable and a wire, and such insulated cable is suitably used as a communication cable. The communication cable includes a data transmission cable such as a LAN cable.

TFE/HFP copolymer also has low flammability and low smoking properties. Thus, insulated cable made from such a copolymer can be used as a plenum cable, which is laid, for example, on the back of a ceiling of a building (plenum area) and strictly regulated for preventing the spread of fire. The insulated cable comprises a core wire such as a cable and an insulating material formed from a resin such as a TFE/HFP copolymer coating the core wire. In general, the insulated cable is manufactured by extrusion coating in which molten resin is extruded in the shape of a tube, drawn down by inserting a core wire through the center portion of the resin tube in its axial direction, and the core wire coated with the resin is then taken up.

The term "draw-down" as used herein means extending a molten resin extruded from a die having an opening of relatively large sectional area to its final intended dimensions. The draw-down is characterized by a draw-down ratio (DDR), which is the ratio of the sectional area of the opening of the die to the sectional area of the insulated material of the final product. In general, the draw-down ratio is suitably from 50 to 150.

The term "insulated" cable as used herein means a cable or wire coated with an insulating material.

Preferably, the draw-down operation is carried out in so that the outer side and inner side of the molten resin, extruded from the die in the form of a tube, are evenly drawn down. This evenness is expressed as draw ratio balance (DRB).

Since in a conventional draw-down operation the resin is drawn as described above, a cone-break sometimes occurs during an extremely short period between the time the resin is extruded from an opening of the die until it contacts a core material. The cone-break is the largest cause of loss in productivity. This is because cone breaks, when they occur, requires restarting the extrusion process and machine utilization is decreased.

In recent years, an increase in molding rate has been desired to enhance productivity and to reduce cost, and there is a demand to increase the cable coating rate by increasing the winding rate of the insulated core wires. The trend of coating the cable at high speed generally increases the occurrence of cone-breaks even though the draw-down ratio is similar.

A technique for reducing the occurrence of cone-breaks is proposed in Publication No. WO 00/44797, in which a TFE/HFP copolymer having a melt flow rate (MFR) of 24 (g/10 minutes) is used and the coating rate of applying an insulating resin to the cable is lower than 2000 ft/minute. Indeed, this copolymer is effective at a coating rate of lower than 2000 ft/minute. However, this technique does not satisfactorily reduce the occurrence of cone-breaks at faster coating rates.

In the coating extrusion, the thickness of the insulating material of the insulated cable is determined by the desired electrical characteristic, and the size of the opening of the die is determined by selecting a draw-down ratio and draw ratio balance suitable for the structure of the insulated cable.

In the case of increasing the cable coating rate without changing the size of the opening of the die, the problem of developing a rough skin on the surface of the resin passing through the opening generally occurs when the velocity of the molten resin in the die exceeds a certain velocity limit. This rough skin is referred to as melt fracture, and it develops when the velocity of the resin exceeds the critical shear rate during melt fluidizing.

The trend of coating cable at high speed also involves the problem of exacerbating the extent of the melt fracture. Excessive melt fracture sometimes leads to a situation where the insulating material does not completely cover the core material, and causes an increase in molding faults such as spark-out and cone-breaks.

As one technique for delaying the occurrence of melt fracture and enabling high-speed coating of about 1.5 times faster than conventional rates, U.S. Pat. No. 5,703,185 discloses that vinyl ether for use as a third monomer component of a TFE/HFP copolymer is changed from perfluoro (propyl vinyl ether) to perfluoro (ethyl vinyl ether). However, this technique encounters difficulty in reducing molding faults such as cone-breaks and the like at high-speed coating rates.

SUMMARY OF THE INVENTION

It is therefore an object of the present invention to provide a fluorine-containing copolymer which improves extrusion moldability for coating an electric cable with an insulating resin, and which is capable of considerably reducing molding faults such as spark-out and cone-breaks over long term operation even when coating at high speed.

The above object of the present invention is achieved by providing a fluorine-containing copolymer obtained by copolymerizing tetrafluoroethylene, hexafluoropropylene and optionally perfluoro vinyl ether as component monomers, wherein a weight ratio of tetrafluoroethylene, hexafluoropropylene and perfluoro vinyl ether units constituting said fluorine-containing copolymer is 70 to 95: 5 to 20: 0 to 10, respectively; the fluorine-containing copolymer having:

a melt flow rate 30 (g/10 minutes) or more:

a volatile content index of 0.2 weight % or less; and a stress relaxation modulus G(t) (unit: dyn/cm$^2$) which satisfies the following formula at t=0.1 second when measured at a temperature of 310° C.:

$$G(0.1) > 7 \times 10^6 \times X^{-1.62} - 3000$$

where X denotes the melt flow rate in units of g/10 minutes.

The present invention is a fluorine-containing copolymer obtained by copolymerizing tetrafluoroethylene, hexafluoropropylene and optionally perfluoro vinyl ether as component monomers, wherein a weight ratio of tetrafluoroethylene, hexafluoropropylene and perfluoro vinyl ether units constituting said fluorine-containing copolymer is 70 to 95: 5 to 20: 0 to 10, respectively;

the fluorine-containing copolymer having:

a melt flow rate 30 (g/10 minutes) or more:

a volatile content index of 0.2 weight % or less; and a stress relaxation modulus G(t) (unit: dyn/cm$^2$) which satisfies the following formula at t=0.1 second when measured at a temperature of 310° C.:

$$G(0.1) > 7 \times 10^6 \times X^{-1.6143} - 3000$$

where X denotes the melt flow rate in units of g/10 minutes.

Hereinafter, the present invention will be described in greater detail.

DETAILED DESCRIPTION OF THE INVENTION

The fluorine-containing copolymer of the present invention is suitably used for coating a core wire with an insulating resin by extrusion processing. The above-mentioned fluorine-containing copolymer is melted by heating within an extruder for coating a core wire and extruded from a die, and then drawn down by coating the core wire to thereby obtain an insulated wire.

In the present specification, the speed at which the core wire coated with insulation by the above extrusion processing is reeled up is referred to as the "coating speed". The coating speed is expressed by the length of insulated core wire reeled up over a period of one minute (expressed by feet "ft")

The fluorine-containing copolymer of the present invention advantageously reduces the occurrence of molding faults such as cone-breaks and spark-out, particularly in the case where the coating operation is carried out at a high-speed of, e.g., 2500 ft/minute or higher.

The fluorine-containing copolymer of the present invention is obtained by copolymerizing tetrafluoroethylene (TFE), hexafluoropropylene (HFP) and perfluoro vinyl ether (PVE) as component monomers.

The above-mentioned perfluoro vinyl ether is an optional component, and in a preferred embodiment the fluorine-containing copolymer of the present invention may be a binary copolymer made up of only TFE and HFP units. As used herein, the above-mentioned binary copolymer excluding PVE is referred to as "non-modified FEP".

The fluorine-containing copolymer of the present invention may be a ternary copolymer containing a small number of perfluoro vinyl ether units (e.g., from 0.1 to 10 wt %) in addition to TFE and HFP units. As used herein, the ternary copolymer is referred to as "modified FEP". One, two or more species of the above-mentioned perfluoro vinyl ether may be used.

The above-mentioned perfluoro vinyl ether is not particularly limited and, for example, includes an unsaturated perfluoro compound represented by the following general formula:

$$CF_2=CF-ORf^1$$

where $Rf^1$ is a perfluoroaliphatic hydrocarbon group. As used herein, a perfluoroaliphatic hydrocarbon group means an aliphatic hydrocarbon group in which all hydrogen atoms linked to the carbon atoms are replaced with fluorine atoms. The above-mentioned perfluoroaliphatic hydrocarbon group may have one or more ether oxygens.

An example of the above-mentioned perfluoro vinyl ether includes perfluoro(alkyl vinyl ether) (PFAVE). PFAVE is a compound represented by the following general formula:

$$CF_2=CFO(CF_2)_nCF_3$$

where n is an integer of 0 to 3. One, two or more species of PFAVE may be used. As PFAVE, perfluoro(ethyl vinyl ether) (PEVE) and perfluoro(propyl vinyl ether) (PPVE) are preferred, and PPVE is more preferred since it can readily increase the speed of the coating extrusion.

Preferred fluorine-containing copolymers of the present invention include modified FEP in which PFAVE is used as the above-mentioned perfluoro vinyl ether in terms of enhancing resistance to stress cracks and enabling high-speed extrusion for coating cable and wire.

A weight ratio of TFE and HFP, and as needed PFAVE, as component monomers of the fluorine-containing copolymer of the present invention is not particularly limited so long as the fluorine-containing copolymer having the properties described below are attained. The weight ratio of TFE, HFP and PFAVE is 70 to 95: 5 to 20: 0 to 10, respectively. When the weight ratio lies within the above-mentioned range, draw-down can be performed sufficiently while maintaining resistance to stress cracks. More preferably, the weight ratio is 75 to 95: 5 to 20: 0 to 5, respectively. The above-mentioned content of TFE, HFP and PFAVE as component monomers is also referred to as a monomer composition.

The fluorine-containing copolymer of the present invention has an MFR of 30 (g/10 minutes) or larger. The above-mentioned fluorine-containing copolymer can lower the pressure of a molten polymer passing through the die and reduce the shearing stress of the polymer. This is because the molecular weight is not high when the MFR lies within the above-mentioned range. Therefore, it is possible to delay the occurrence of the melt fracture, and it becomes possible to increase the coating rate. Further, when the MFR lies within the above-mentioned range, since the polymer is easily self-fluidized until cooled after being extruded from the die, the surface of the resulting insulating material becomes smooth. Therefore, it is possible to attain an insulated cable or wire which does not show traces of melt fracture and which exhibits less variation in outer diameter. Thus, a product exhibiting less fluctuation in capacitance is obtained. When the MFR is less than 30 (g/10 minutes), since the extent of melt fracture becomes intense and cone-breaks and spark-out resulting therefrom easily develop, it is difficult to coat the cable at high speed. The MFR is preferably (30 to 50) (g/10 minutes) in terms of easily allowing for the above-mentioned first coating rate, and more preferably (30 to 45) (g/10 minutes)

The MFR is an index of melt-fluidity. Even though conventional coating extrusion is performed at a lower speed than the faster rate in accordance with the present invention, melt fractures often develop. It is generally considered that the shearing stress when passing the molten polymer through the die will increase and the extent of the melt fracture will become high when the coating rate is increased. However, in accordance with the present invention, by having an MFR within the above-mentioned range, it is possible to restrain the occurrence of melt fracture as described above even when coating the cable at high speed.

The fluorine-containing copolymer of the present invention has a stress relaxation modulus G(t) (unit: dyn/cm$^2$) which satisfies the following formula at t=0.1 second when measured at a temperature of 310° C.:

$$G(0.1) > 7 \times 10^6 \times X^{-1.62} - 3000,$$

where X denotes the melt flow rate (unit: g/10 minutes). The above fluorine-containing copolymer can maintain molding stability without developing molding faults such as cone-breaks and spark-out over long term operation even in the case of coating the cable at high speed when the stress relaxation modulus thereof is within the ranges described above. Preferably, the stress relaxation modulus satisfies the following formula at t=0.1 second when measured at a temperature of 310° C.:

$$G(0.1) > 7 \times 10^6 \times X^{-1.6143} - 3000,$$

more preferably, the stress relaxation modulus satisfies the following formula at t=0.1 second when measured at a temperature of 310° C.:

$$G(0.1) > 7 \times 10^6 \times X^{-1.62}, \text{ and}$$

still more preferably, the stress relaxation modulus satisfies the following formula at t=0.1 second when measured at a temperature of 310° C.:

$$G(0.1) > 7 \times 10^6 \times X^{-1.6143}.$$

The stress relaxation modulus is a value obtained by measuring at a certain point in the process where the stress developed inside decreases with time after applying strain. When the fluorine-containing copolymer satisfies the above-mentioned formula, it can control the occurrence of molding faults. This is because the polymer can withstand the stretching stress applied until the polymer coats the conductor by extruding the polymer from the die even in the case of coating the cable at high speed. Preferably, the upper limit of the stress relaxation modulus at t=0.1 second when measured at a temperature of 310° C. (G(0.1)) is 100000, since the stretching stress of the fluorine-containing copolymer is not too high and draw-down can be performed sufficiently so that the occurrence of molding faults can be reduced when the fluorine-containing copolymer has the MFR of 30 (g/10 minutes) or larger.

The fluorine-containing copolymer of the present invention has a volatile content index of 0.2% by weight or less. When the volatile content index lies within the above-mentioned range, minute bubbles do not develop in the above-mentioned insulating material, and therefore the fluorine-containing copolymer does not cause molding faults such as spark-out and cone-breaks even in the case of coating the cable at high speed. When the volatile content index exceeds 0.2% by weight, minute bubbles develop in the above-mentioned insulating material and cause melt fractures such as spark-outs and cone-breaks accompanying the thin insulation due to draw-down. Therefore, moldability becomes unstable and it becomes difficult to coat the cable at high speed.

The volatile content generally results from any of a functional group at the end of the polymer, which is unstable at an elevated temperature, a substance formed by decomposition of a polymer main chain, an oligomer produced in polymerization and residuals due to a lack of deaeration in melt-pelletizing.

Preferably, the fluorine-containing copolymer of the present invention has a melting point of 245 to 280° C. Such a fluorine-containing copolymer has sufficient melt-fluidity at normal molding temperatures, and is capable of having a wide molding region while maintaining heat resistance. More preferably, the melting point thereof is 245 to 260° C.

The process for producing the fluorine-containing copolymer of the present invention is not particularly limited, and may be produced by polymerizing the monomer components using conventional polymerization processes such as emulsion polymerization, suspension polymerization, solution polymerization, bulk polymerization and gas-phase polymerization.

Examples of a chain transfer agent that can be used to polymerize the monomer components include a liquid chain transfer agent such as isoparaffin, carbon tetrachloride, diethyl malonate, mercaptan, diethyl ether, alcohol and the like. Further, a gaseous chain transfer agent such as methane, ethane and the like can be used.

Ammonium persulfate and/or potassium persulfate can be used as a polymerization initiating agent to start the polymerization reaction by initial charging. Although the initially charged polymerization initiating agent is consumed or decomposed with progression of the reaction from just after the start of the reaction, by continuously adding an appropriate amount, the molecular weight, molecular weight distribution and the like can be controlled.

If suspension polymerization is used, diacyl peroxide is preferably used as the polymerization initiating agent. A suitable polymerization initiating agent is a fluorine-containing peroxide expressed by the formula:

$$(Rf^2COO)_2$$

where $Rf^2$ is a perfluoroalkyl group, a hydrofluoroalkyl group or a perchlorofluoroalkyl group.

The fluorine-containing compound of the present invention is used in any form of powder, pellet and the like in the extrusion processing, but is generally used in pellet form.

A method of preparing the above-mentioned pellet is not particularly limited, and a conventionally known method, for example, may be used. One method, for example, of pelletizing the resin powder obtained by the above-mentioned polymerizing method comprises using an extruder and heating the resin powder, for example, to a temperature higher than the melting point of the above-mentioned fluorine-containing copolymer and lower than the decomposition temperature of the fluorine-containing copolymer to melt and knead the resin.

The above-mentioned pellet may be formulated with other components together with the fluorine-containing copolymer as needed. Such additional components are not limited in particular, and additives such as various fillers, stabilizers, lubricants, crosslinking agents and other conventional additives may be used.

In the method of producing the above-described pellets, the fluorine-containing copolymer of the present invention may be adjusted to attain a stress relaxation modulus, volatile content index, MFR and melting point within the above-mentioned ranges by using the method, for example, as described below.

The above-mentioned fluorine-containing copolymer can be adjusted to have a stress relaxation modulus satisfying the above formula by adjusting molecular weight, distribution of molecular weight, extent of entanglement of high polymers, branching of high polymers, the degree of cross linkage, polymer composition and the formulation of additives.

The fluorine-containing copolymer can be adjusted to have a volatile content index within the above-mentioned range by carrying out end stabilization of unstable ends as required. The end stabilization includes, for example, heat-treating in fluorine gas, adding a chain transfer agent during polymerization and heat-treating after emulsion polymerization. It is also possible to adjust the extent of end stabilization by adjusting the addition amount of the chain transfer agent and the addition time thereof, and the temperature and the time period of heat treatment.

The fluorine-containing copolymer can be adjusted to have an MFR and melting point within the above-mentioned ranges by adjusting the molecular weight and the distribution of molecular weight of the fluorine-containing copolymer, by adjusting the addition amounts of the chain transfer agent and an initiator during polymerization, or by adjusting the monomer composition.

For the fluorine-containing copolymer of the present invention, when the resin powder obtained by polymerization is pelletized, it is possible to adjust the extent of reduction in the volatile content index and increase in MFR by adjusting the heating temperature, heating time and the like.

The method of insulating cable or wire of the invention comprises extrusion coating cable or wire with the above fluorine-containing copolymer.

The method of extrusion coating with the fluorine-containing copolymer of the present invention is not particularly limited, and, for example, a conventionally well-known method can be used. A conventional extruder for coating cables may be used.

The rate of coating the cable is not limited in particular, and it is possible to obtain the effect of the invention, which suppresses molding faults, at coating rates of from 2500 to 3500 ft/minute, and particularly of from 2800 to 3000 ft/minute.

Needless to say, the fluorine-containing copolymer of the present invention can also be effectively used at lower coating speeds, such as less than 2,500 ft/min. which have been employed in conventional extrusion coating, for example, approximately 1,000 to 2,500 ft/min.

The insulated cable of the present invention comprises a core conductor coated with an insulating material comprising the above fluorine-containing copolymer. The core conductor can be a no-covering conductor or a conductor with a covering material e.g. a wire or a cable, to be used as a core of the insulated cable, and may be referred to as "conductor" comprising copper etc., "core wire" or "core cable" in this specification.

The insulated cable obtained by the above-described coating extrusion is not particularly limited as long it includes a core wire and an insulating material coating the same, and includes, for example, a cable, a wire and the like. Among these, the insulated cable is suitably used as an insulated communication wire, for example, a cable connecting a computer and peripherals thereof, including a data transfer cable such as a LAN. It is also suitably used as a plenum cable.

As used herein, the monomer composition, MFR, stress relaxation modulus, volatile content index and melting point described above are defined or measured as follows.

(A) Monomer Composition

The monomer composition is obtained by NMR analysis and measuring the contents of TFE, HFP and PFAVE. Further, generally, the monomer composition can also be determined by infrared absorption spectrum analysis as described in Japanese Kokoku Publication Sho-63-2281.

(B) MFR

Using a melt index tester in compliance with ASTM D 1238-98 or JIS K 7210, approximately 6 g of resin is charged in a cylinder having an inner diameter of 0.376 inch and maintained at 372° C.±0.5° C. for five minutes until an equilibrium temperature is reached. Then., the molten resin is extruded through an orifice having a diameter of 0.0825 inch and a length of 0.315 inch under a piston load of 5,000 g, and the weight of the resin (unit: g) collected in a unit period of time (usually 10 to 60 seconds) is measured. Three measured values are averaged and converted to the amount of extrusion per 10 minutes as the MFR (unit: g/10 min.).

(C) Stress Relaxation Modulus

The measurement sample is prepared by compression molding That is, the resin is charged into a die of 25 mm in diameter, and after heating at a temperature of 340° C. for 30 minutes, the molten resin is cooled under an applied pressure of 40 Kg/cm$^2$ and a sheet having a thickness of 1.5±0.1 mm is prepared.

A dynamic analyzer RAD II made by Rheometric Scientific Company is used as the measuring apparatus, and Rhios V4.3.2 by the same company is used as analysis software. When measuring, a pair of parallel plates is selected as a tool, and a plate having an outer diameter of 25 mm is used.

The measurement is carried out under the following conditions:

distance between the parallel plates: 1.0 mm
test procedure: Dynamic Frequency Sweep Default Test
strain: 0.1 (unit: %)
measuring temperature: 310° C.
measuring frequency: 0.1 to 500 rad/sec.

After the sample is placed on the parallel plate and heated to a measuring temperature of 310° C., the distance between the parallel plates is moved so as to be 1 mm. The resin protruding from the parallel plates is removed, and the measurement is started 100 seconds after the sample again reaches 310° C. After completing the measurement, viscosity, storage elastic modulus and loss of elastic modulus at each frequency are obtained, and the stress relaxation modulus at 0.1 second is determined using the Rhios V4.3.2 (Rheometric Scientific Company) as the analysis software.

(D) Volatile Content Index

Using an electric oven having a turntable, the volatile content (% by weight) is measured as follows. That is, as a sample, 20±0.1 g of the above FEP in pellet form is weighed out using a precision balance having an accuracy of 0.1 mg and in an aluminum cup that has been baked at 370° C. beforehand in an empty state. The letter A used herein indicates the weight of the baked aluminum cup and the letter B indicates the weight of the aluminum cup in which the sample is placed. As for B, two aluminum cups containing a sample per each sample to be measured are prepared and an average value of the two cups is used. A standard sample having a known volatilized amount is also weighed out at the same time as a control. These are quickly put onto the turntable of the electric oven, which has been heated to 370° C. At this time, the rotation speed of the turntable is 6 rpm.

30 minutes after the internal temperature is returned to 370° C., the samples are removed from the oven and quickly put in a desiccator, in which they are cooled for over an hour. Then, the weight of the sample is precisely weighed using the above precision scale. The letter C denotes the weight at this time. The weight reduction of the sample after heating for 30 minutes at 370° C. is calculated by the following formula and is referred to as the volatile content index (% by weight):

Volatile content index (% by weight)=
((B−C)/(B−A))×100

(E) Melting Point

Using DSC (differential scanning calorimetry) as described in ASTM D 4591-87, the melting point is measured at a temperature-rise rate of 10° C./minute. A peak temperature of an endothermic reaction indicating a maximum is taken as the melting point.

BEST MODE FOR CARRYING OUT THE INVENTION

The present invention is described in further detail by means of the following Examples. However, the present invention should not be construed as being limited thereto.

EXAMPLE 1

(Manufacturing of Modified FEP Powder)

310 kg of pure water and 200 g of w-hydrofluorocarboxylic acid were charged into a 1,000-L glass lined autoclave having a stirrer. After purging with nitrogen, a vacuum was established, and 320 kg of hexafluoropropylene (HFP) and 3 kg of perfluoro(propyl vinyl ether) (PPVE) as a perfluoro (alkyl vinyl ether) (PFAVE) were charged thereto. Stirring was started, the temperature of the polymerizing vessel was set at 34.0° C., and the pressure was increased to 10.5 MPaG with perfluoroethylene (TFE). Then, when 3.8 kg of di-(w-hydrodecafluoroheptanol)peroxide (DHP) diluted to approximately 8 wt % with perfluorohexane was added, the reaction began immediately. During the reaction, TFE was additionally charged in an amount of 310 kg to maintain the pressure in the autoclave at 10.5 MPaG. During the reaction, when the amount of TFE supplied reached 25 wt %, 50 wt % and 75 wt % of the reaction mixture, PPVE was charged in amount of 800 g at each time interval. Also, 2 and 4 hours after the start of the reaction, DHP was added each time in an amount of 3.8 kg, and six hours after the start of the reaction and every two hours thereafter, DHP was added in an amount of 1.9 kg, respectively. In order to adjust the molecular weight, 7 hours after the start of the reaction, 4.1 kg of methanol was added as a chain transfer agent.

After a total reaction time of 24 hours, non-reacted TFE and HFP were released to obtain a granular powder. Pure water was added to this powder, and after stirring and washing, it was removed from of the autoclave. The powder was then dried for 24 hours at 150° C. to obtain 357 kg of the above-mentioned modified FEP powder.

The resulting modified FEP powder measured as described above had a composition weight ratio of TFE, HFP and PPVE of 87.2:11.8:1.0.

(Pelletization and Evaluation of Physical Properties)

Using a 50 mm-diameter extruder having a barrel to die temperature set at 360° C., the above modified FEP powder was pelletized at a speed of 12 kg/hour, and then deaerated for 8 hours at 230° C.

The respective measurements by the methods described above on the resulting pellets showed that MFR was 38 (g/10 minutes), the volatile content index was 0.133% by weight, the melting point was 256.3° C. and the stress relaxation modulus satisfied the above-mentioned formula. The results are given in Table 1.

(Extrusion Coating)

Measurement of spark-out and cone-breaks were measured by the following method.

1) Conditions of Extrusion Coating for Measurement

The above-mentioned insulated material obtained by extrusion coating under the following conditions was evaluated.

standard core wires: AWG 24
diameter of core wires: 20.1 mil (about 0.51 mm)
thickness of insulation: 7.5 mil (about 0.19 mm)
diameter of insulated cable: 35.1 mil (about 0.89 mm)
coating extrusion conditions cylinder diameter: 50 mm

L/D: 30 temperature (° C.):

Z1: 338 Z2: 360 Z3: 371 Z4: 382 Z5: 399

CL: 404 AD: 404 HD: 404 DIE: 404
preheating-temperature of core wires: 165° C.
cone length: 4.7 cm
length of air cooling: 20 ft
inner diameter of die: 8.71 mm, outer diameter of tip: 4.75 mm 2) Measuring Methods The spark-out of the above-mentioned insulated material was measured using a Model HF-20-H (measuring voltage 2.0 KV) instrument made by CLINTON INSTRUMENT COMPANY.

The occurrence of cone-breaks of the above-mentioned insulated material was measured using a KW 32 TR10 instrument made by Zumbach Co. The instrument was set to detect a diameter, being 50 mil (about 1.2 mm) or more, larger than the nominal outer diameter of the insulated wire, and the number of the cone-breaks was measured.

The coating extrusion was performed at respective rates of 1600, 2000, 2400, 2800 and 3000 ft/minute under the above-mentioned conditions, and the number of spark-outs and cone-breaks per 1,000,000 ft of the insulated wire thus prepared was measured. The results are given in Table 2.

EXAMPLE 2

The same method as described in Example 1 was used, except for changing the temperature of the polymerization bath to 35° C., the addition amount of methanol to 1.3 kg, the methanol-addition time to 12 hours following initiation of the reaction, and the total reaction time to 30 hours. Also, PPVE was not added.

EXAMPLE 3

The same method as described in Example 1 was used, except for changing the temperature of the polymerization bath to 35° C., the addition amount of methanol to 2 kg, the methanol-addition time to 13 hours following initiation of the reaction, and the total reaction time to 28 hours.

EXAMPLE 4

The same method as described in Example 1 was used, except for changing the methanol-addition time to 10 hours following initiation of the reaction.

EXAMPLE 5

The same method as described in Example 1 was used, except for changing the addition amount of methanol to 4.4 kg, and the methanol-addition time to 10 hours following initiation of the reaction.

EXAMPLE 6

The same method as described in Example 1 was used, except for changing the addition amount of methanol to 4.2 kg, and the methanol-addition time to 10 hours following initiation of the reaction.

COMPARATIVE EXAMPLE 1

The same method as described in Example 1 was used, except for changing the addition amount of methanol to 3.4 kg and the total reaction time to 22 hours.

COMPARATIVE EXAMPLE 2

The same method as described in Example 2 was used, except for changing the addition amount of methanol to 1 kg.

COMPARATIVE EXAMPLE 3

The same method as described in Example 1 was used, except for changing the addition amount of methanol to 3.4 kg, the methanol-addition time to 5 hours following initiation of the reaction, and the extrusion rate in pelletizing to 50 kg/hr.

COMPARATIVE EXAMPLE 4

The same method as described in Example 1 was used, except for changing the addition amount of methanol to 3.4 kg and the methanol-addition time to 5 hours following initiation of the reaction.

COMPARATIVE EXAMPLE 5

The same method as described in Example 1 was used, except for changing the addition amount of methanol to 4.4 kg, the methanol-addition time to 5 hours following initiation of the reaction, and the total reaction time to 22 hours.

COMPARATIVE EXAMPLE 6

The same method as described in Example 1 was used, except for changing the addition amount of methanol to 2.0 kg, the methanol-addition time to 7 hours following initiation of the reaction, and the total reaction time to 22 hours.

COMPARATIVE EXAMPLE 7

The same method as described in Example 1 was used, except for changing the addition amount of methanol to 3.4 kg, the methanol-addition time to 10 hours following initiation of the reaction, and the total reaction time to 22 hours.

COMPARATIVE EXAMPLE 8

The same method as described in Example 1 was used, except for changing the addition amount of methanol to 3.4 kg, and the methanol-addition time to 7 hours following initiation of the reaction.

TABLE 1

|  |  | Example | | | | | | Comparative Example | |
| --- | --- | --- | --- | --- | --- | --- | --- | --- | --- |
|  |  | 1 | 2 | 3 | 4 | 5 | 6 | 1 | 2 |
| Polymerization | | | | | | | | | |
| Water | (kg) | 310 | 310 | 310 | 310 | 310 | 310 | 310 | 310 |
| Reaction temperature | (° C.) | 34 | 35 | 35 | 34 | 34 | 34 | 34 | 35 |
| HFP | (kg) | 320 | 320 | 320 | 320 | 320 | 320 | 320 | 320 |
| Pressure | (MpaG) | 10.5 | 10.5 | 10.5 | 10.5 | 10.5 | 10.5 | 10.5 | 10.5 |
| PPVE (initial) | (kg) | 3 | 0 | 3 | 3 | 3 | 3 | 3 | 0 |
| PPVE (every charge) | (g) | 800 | 0 | 800 | 800 | 800 | 800 | 800 | 0 |
| DHP (initial, 2 hrs & 4 hrs after start of reaction) | (kg) | 3.8 | 3.8 | 3.8 | 3.8 | 3.8 | 3.8 | 3.8 | 3.8 |
| DHP (6 hrs after start of reaction and subsequently) | (kg) | 1.9 | 1.9 | 1.9 | 1.9 | 1.9 | 1.9 | 1.9 | 1.9 |
| Methanol | (kg) | 4.1 | 1.3 | 2 | 4.1 | 4.4 | 4.2 | 3.4 | 1 |
| Methanol-addition time after reaction | (hour) | 7 | 12 | 13 | 10 | 10 | 10 | 7 | 12 |
| Total reaction time | (hour) | 24 | 30 | 28 | 24 | 24 | 24 | 22 | 30 |
| Yield | (kg) | 357 | 350 | 362 | 357 | 357 | 355 | 358 | 350 |
| Pelletizing | | | | | | | | | |
| Extrusion temperature | (° C.) | 360 | 360 | 360 | 360 | 360 | 360 | 360 | 360 |
| Extrusion rate | (kg/hour) | 12 | 12 | 12 | 12 | 12 | 12 | 12 | 12 |
| Deaeration time | (hours) | 8 | 8 | 8 | 8 | 8 | 8 | 8 | 8 |
| Pellet characteristics | | | | | | | | | |
| MFR | (g/10 min.) | 38.0 | 32.0 | 44.0 | 31.0 | 42.0 | 35.0 | 24.0 | 27.0 |
| HFP/PPVE | (wt %) | 11.8/1.0 | 13.7/0.0 | 13.0/0.9 | 11.9/0.9 | 11.8/0.9 | 11.8/1.0 | 11.7/1.0 | 13.7/0.0 |
| Melting point | (° C.) | 256.3 | 250.1 | 248.3 | 254.3 | 258.2 | 257.8 | 255.3 | 250.5 |
| Volatile content index | (wt %) | 0.133 | 0.123 | 0.148 | 0.105 | 0.120 | 0.111 | 0.128 | 0.138 |
| *1) G(t)t = 0.1 | (dyn/cm$^2$) | 21118 | 28005 | 15602 | 48768 | 31528 | 38568 | 44867 | 36578 |
| *2) $7 \times 10^6 \times X^{-1.62}$ | (dyn/cm$^2$) | 19313 | 25513 | 15230 | 26859 | 16422 | 22065 | 40659 | 33596 |

TABLE 1-continued

|  |  | Comparative Example | | | | | |
|---|---|---|---|---|---|---|---|
|  |  | 3 | 4 | 5 | 6 | 7 | 8 |
| Polymerization |  |  |  |  |  |  |  |
| Water | (kg) | 310 | 310 | 310 | 310 | 310 | 310 |
| Reaction temperature | (° C.) | 34 | 34 | 34 | 34 | 34 | 34 |
| HFP | (kg) | 320 | 320 | 320 | 320 | 320 | 320 |
| Pressure | (MpaG) | 10.5 | 10.5 | 10.5 | 10.5 | 10.5 | 10.5 |
| PPVE (initial) | (kg) | 3 | 3 | 3 | 3 | 3 | 3 |
| PPVE (every charge) | (g) | 800 | 800 | 800 | 800 | 800 | 800 |
| DHP (initial, 2 hrs & 4 hrs after start of reaction) | (kg) | 3.8 | 3.8 | 3.8 | 3.8 | 3.8 | 3.8 |
| DHP (6 hrs after start of reaction and subsequently) | (kg) | 1.9 | 1.9 | 1.9 | 1.9 | 1.9 | 1.9 |
| Methanol | (kg) | 3.4 | 3.4 | 4.4 | 2 | 3.4 | 3.4 |
| Methanol-addition time after reaction | (hour) | 5 | 5 | 5 | 7 | 10 | 7 |
| Total reaction time | (hour) | 24 | 24 | 22 | 22 | 22 | 24 |
| Yield | (kg) | 357 | 357 | 353 | 356 | 358 | 358 |
| Pelletizing |  |  |  |  |  |  |  |
| Extrusion temperature | (° C.) | 360 | 360 | 360 | 360 | 360 | 360 |
| Extrusion rate | (kg/hour) | 50 | 12 | 12 | 12 | 12 | 12 |
| Deaeration time | (hours) | 8 | 8 | 8 | 8 | 8 | 8 |
| Pellet characteristics |  |  |  |  |  |  |  |
| MFR | (g/10 min.) | 35.6 | 36.0 | 42.0 | 20.0 | 20.0 | 25.0 |
| HFP/PPVE | (wt %) | 11.8/1.0 | 11.7/0.9 | 11.8/0.9 | 11.8/1.0 | 11.7/0.9 | 11.6/1.0 |
| Melting point | (° C.) | 257.1 | 256.8 | 257.9 | 256.5 | 257.0 | 256.3 |
| Volatile content index | (wt %) | 0.238 | 0.146 | 0.103 | 0.095 | 0.105 | 0.120 |
| *1) $G(t)_{t=0.1}$ | (dyn/cm$^2$) | 25666 | 16988 | 10877 | 38728 | 67638 | 19231 |
| *2) $7 \times 10^6 \times X^{-1.62}$ | (dyn/cm$^2$) | 21466 | 21081 | 16422 | 54630 | 54630 | 38057 |

*1) indicates measured values and
*2) indicates calculated value.

TABLE 2

|  |  |  | Example | | | | | | Comparative Example | | | | | | |
|---|---|---|---|---|---|---|---|---|---|---|---|---|---|---|---|
|  |  |  | 1 | 2 | 3 | 4 | 5 | 6 | 1 | 2 | 3 | 4 | 5 | 6 | 7 | 8 |

Number of spark-outs and cone-breaks per 1,000,000 ft of the insulated cable at the respective rates of coating (ft/min.)

| 1600 (ft/min.) | spark-outs | (number) | 1 | 2 | 3 | 2 | 2 | 2 | 1 | 1 | 10 | 3 | 3 | 3 | 4 | 5 |
| | cone-breaks | (number) | 0 | 0 | 0 | 0 | 0 | 0 | 0 | 0 | 3 | 0 | 0 | 0 | 0 | 0 |
| | Note | | | | | | | | | | | | | | | |
| 2000 (ft/min.) | spark-outs | (number) | 2 | 1 | 3 | 2 | 2 | 2 | 2 | 3 | 9 | 3 | 4 | 5 | 4 | 8 |
| | cone-breaks | (number) | 0 | 0 | 0 | 0 | 0 | 0 | 0 | 0 | 4 | 0 | 0 | 1 | 0 | 1 |
| | Note | | | | | | | | | | | | | | | |
| 2400 (ft/min.) | spark-outs | (number) | 3 | 3 | 4 | 2 | 3 | 2 | 5 | 2 | 12 | 10 | 11 | 12 | 12 | 10 |
| | cone-breaks | (number) | 0 | 0 | 0 | 0 | 0 | 0 | 1 | 0 | 5 | 1 | 1 | 4 | 2 | 1 |
| | Note | | | | | | | | | | | | | | | |
| 2800 (ft.min.) | spark-outs | (number) | 4 | 2 | 4 | 3 | 3 | 3 | many | 20 | 20 | 14 | 18 | 20 | 19 | 20 |
| | cone-breaks | (number) | 0 | 0 | 0 | 0 | 0 | 0 | 21 | 5 | 7 | 4 | 4 | 10 | 10 | 8 |
| | Note | | | | | | | | imprac-tical | | | | | | | |
| 3000 (ft/min.) | spark-outs | (number) | 2 | 3 | 3 | 4 | 3 | 4 | — | many | many | 40 | 38 | many | many | 39 |
| | cone-breaks | (number) | 0 | 0 | 0 | 0 | 0 | 0 | — | 21 | 21 | 25 | 16 | 39 | 35 | 25 |
| | Notes | | | | | | | | — | imprac-tical | imprac-tical | imprac-tical | imprac-tical | imprac-tical | imprac-tical | imprac-tical |

In Table 1, HFP/PPVE indicates the content of HFP or PPVE units expressed (% by weight) in terms of all monomer components constituting the above-described modified FEP obtained. HFP/PPVE in Table 3 is the same.

From Table 1 and 2, it was found that the occurrence of both spark-out and cone-breaks was reduced in each of the Examples of the present invention and these examples had superior moldability. On the contrary, the occurrence of spark-out and cone-breaks was high and the number of occurrences thereof was large particularly in high-speed coating at a rate of 2800 ft/minute or higher in Comparative Examples 1 and 2 in which the MFR was less than 30 (g/10 minutes), in Comparative Example 3 in which the volatile content index was larger than 0.2% by weight, in Comparative Example 4 in which the stress relaxation modulus did not satisfy the above-mentioned formula, and in Comparative Example 5 to 8 in which the MFR was less than 30 (g/10 minutes) and/or the stress relaxation modulus did not satisfy the above-mentioned formula.

EXAMPLE 7

(Manufacture of a Dispersion Solution of an FEP Copolymer Containing FEP Copolymer Seed Particles)

A 50-L stainless autoclave with a stirrer was deaerated, and then charged with 30 kg of deaerated distilled water and 8 kg of a 10% by weight of an aqueous solution of fluorine surfactant ($C_7F_{15}COONH_4$). Further, 5 kg of HFP (liquid) and then a gaseous TFE-HFP mixed monomer (TFE:HFP=86:14 in weight ratio) were charged thereto. The temperature was raised gradually while stirring. As a result, the pressure of the atmosphere in the autoclave was raised to 1.5 MPaG at 95° C.

As an initiator, 3.5 kg of an ammonium persulfate aqueous solution (APS) (10% by weight) was charged to start the reaction. The above mixed monomer was continuously supplied to maintain the pressure at 1.5 MPaG. After 30 minutes, stirring was stopped, and non-reacted TFE and HFP were collected to obtain 31.4 kg of a dispersion solution of an FEP copolymer having a solids content of 4.5% by weight. This dispersion solution is referred to as an FEP copolymer dispersion solution containing FEP copolymer seed particles.

Some of the dispersion solution was coagulated using nitric acid to obtain a white powder. The composition of the copolymer thus obtained had a weight ratio of TFE:HFP=86.0:14.0. It was impossible to measure the MFR, die swell and volatile content.

(Manufacturing of Modified FEP Powder)

Next, a 50-L stainless autoclave with a stirrer was deaerated, and charged with 30 kg of deaerated distilled water. Then, 1 kg of the FEP copolymer dispersion solution containing FEP copolymer seed particles that had been prepared beforehand were charged to the autoclave. Further, 6.9 kg of HFP (liquid), and then 0.2 kg of PPVE, and then a gaseous TFE-HFP mixed monomer (TFE:HFP=86:14 in weight ratio) were charged thereto. The temperature was raised gradually while stirring, and the pressure of the atmosphere in the autoclave was raised to 4.2 MPaG at 95° C.

APS (10% by weight; 1.1 kg) was then charged to start the reaction. Upon start of the reaction, a gaseous TFE-HFP mixed monomer having the same composition as mentioned above was continuously supplied to maintain a pressure of 4.2 MpaG. Further, every time the amount of the TFE-HFP mixed monomer that had been supplied during reaction reached 25, 50 and 75 wt %, PPVE was charged in an amount of 20 g. Polymerization was continued until the solid content concentration of the polymer reached 20% by weight. The total reaction time was 45 minutes.

Then, unreacted TFE and HFP were recovered, and the dispersion was removed and coagulated with nitric acid to obtain a white powder of modified FEP. The amount of the modified FEP dried was 7.7 kg.

The resulting modified FEP powder as measured by the methods described above was composed of TFE, HFP and PPVE units having a weight ratio of 86.1:12.9:1.0.

(End Stabilizing, Pelletizing and Evaluation of Physical Properties)

The modified FEP powder was heat-treated in a wet condition for one hour in an end-stabilizing process and melted for pelletizing by the method described in Example 1. A sample was obtained by deaeration operation. The respective measurements measured by the methods described above on the resulting pellets showed that the MFR was 36 (g/10 minutes), the volatile content index was 0.09% by weight, and that the stress relaxation modulus satisfied the above-mentioned formula. The results are given in Table 3.

(Coating Extrusion)

Then, coating extrusion was performed by the method described in Example 1, and spark-outs and cone-breaks were evaluated. The results are given in Table 3.

COMPARATIVE EXAMPLE 9

In production of a modified FEP powder, the method described in Example 7 was used except for supplying APS (10% by weight) continuously in an amount of 0.9 kg at a rate of 1.1 g/minute.

TABLE 3

|  |  | Example 7 | Comparative Example 9 |
|---|---|---|---|
| Polymerization | | | |
| Water | (kg) | 30 | 30 |
| Seed (4.5%) | (kg) | 1 | 1 |
| Reaction temperature | (° C.) | 95 | 95 |
| HFP | (kg) | 6.9 | 6.9 |
| Pressure | (MpaG) | 4.2 | 4.2 |
| PPVE (initial) | (kg) | 0.2 | 0.2 |
| PPVE (every charge) | (g) | 20 | 20 |
| APS (10%) | (kg) | 1.1 | 0.9 |
| APS (10%)(supplied continuously) | (g/min.) | 0.5 | 1.1 |
| Total reaction time | (min.) | 45 | 45 |
| Yield | (kg) | 7.7 | 8.2 |
| Pelletizing | | | |
| Wet heat treatment time | (min.) | 60 | 60 |
| Temperature of extrusion | (° C.) | 360 | 360 |
| Extrusion rate | (kg/hour) | 12 | 12 |
| Deaeration time | (hours) | 8 | 8 |
| Characteristic of pellet | | | |
| MFR | (g/min.) | 36 | 35 |
| HFP/PPVE | (wt %) | 12.9/1.0 | 12.9/1.0 |
| Melting point | (° C.) | 247.3 | 247.5 |
| Volatile content index | (wt %) | 0.09 | 0.129 |
| *1) G(t) t = 0.1 | (dyn/cm$^2$) | 23056 | 17790 |
| *2) $7 \times 10^6 \times X^{-1.62}$ | (dyn/cm$^2$) | 21081 | 22065 |
| Number of spark-outs and cone-breaks per 1,000,000 ft of insulated cable at the respective coating rates (ft/min.) | | | |
| 1600 (ft/min.) spark-outs | (number) | 0 | 2 |
| cone-breaks | (number) | 0 | 0 |
| 2000 (ft/min.) spark-outs | (number) | 0 | 9 |
| cone-breaks | (number) | 0 | 0 |
| 2400 (ft/min.) spark-outs | (number) | 0 | 10 |
| cone-breaks | (number) | 0 | 0 |
| 2800 (ft/min.) spark-outs | (number) | 1 | 18 |
| cone-breaks | (number) | 0 | 3 |
| 3000 (ft/min.) spark-outs | (number) | 2 | 30 |
| cone-breaks | (number) | 0 | 22 |

*1) indicates measured values and *2) indicates a calculated value.

Table 3 shows that when the stress relaxation modulus does not satisfy the above-mentioned formula (Comparative Example 9), the occurrence of spark-outs and cone-breaks was higher as compared with Example 7, and that the occurrence thereof increased with an increase in the coating rate of the cable in Comparative Example 9 in which the amount and the rate of APS addition were changed.

INDUSTRIAL APPLICABILITY

The fluorine-containing copolymer of the present invention has a specific monomer composition as described above, an MFR of 30 (g/10 minutes) or more, a volatile content index of 0.2% by weight or less, and a stress relaxation modulus which satisfies the above-mentioned formula. As a result, the occurrence of molding faults such as cone-breaks and spark-out are considerably reduced as compared to conventional extrusion processing over long term operation even in the case of extrusion coating electric cable with an insulating resin at high speed. In addition, the insulating material and the insulated cable thus obtained have durability to withstand long term use since they have superior physical properties such as electric characteristics and superior mechanical strength.

Accordingly, the fluorine-containing copolymer of the present invention is suitably used for extrusion coating of core materials, and in particular exerts the above-mentioned superior effects in the case of high-speed coating.

An insulating material and insulated cable formed from the above fluorine-containing copolymer are additional embodiments of the present invention.

The invention claimed is:

1. A fluorine-containing copolymer obtained by copolymerizing tetrafluoroethylene, hexafluoropropylene and optionally perfluoro vinyl ether as component monomers,
    wherein a weight ratio of tetrafluoroethylene, hexafluoropropylene and perfluoro vinyl ether units constituting said fluorine-containing copolymer is 70 to 95: 5 to 20: 0 to 10, respectively;
    said fluorine-containing copolymer having:
    a melt flow rate of 30 (g/10 minutes) or more;
    a volatile content index of 0.2% by weight or less; and
    a stress relaxation modulus G(t) (unit: dyn/cm$^2$) which satisfies the following formula at t =0.1 second when measured at a temperature of 310° C.:

$$G(0.1) > 7 \times 10^6 \times X^{-1.62} - 3000$$

where X denotes the melt flow rate (unit: g/10 minutes).

2. The fluorine-containing copolymer as claimed in claim 1, having a stress relaxation modulus G(t) (unit: dyn/cm$^2$) which satisfies the following formula at t=0.1 second when measured at a temperature of 310° C.:

$$G(0.1) > 7 \times 10^6 \times X^{-1.62}$$

where X denotes the melt flow rate (unit: g/10 minutes).

3. The fluorine-containing copolymer as claimed in claim 1, having a melting point of from 245 to 280° C.

4. The fluorine-containing copolymer as claimed in claim 1, having a melt flow rate of from 30 to 50 (g/10 minutes).

5. The fluorine-containing copolymer as claimed in claim 1, having volatile content index of 0.15% by weight or less.

6. The fluorine-containing copolymer as claimed in claim 1, having a weight ratio of tetrafluoroethylene, hexafluoropropylene and perfluoro vinyl ether units of 75 to 95: 5 to 20: 0 to 5, respectively.

7. An insulating material comprising the fluorine-containing copolymer as claimed in claim 1.

8. An insulated cable comprising a core conductor coated with an insulating material comprising the fluorine-containing copolymer as claimed in claim 1.

9. A method of insulating cable or wire which comprises extrusion coating cable or wire with the fluorine-containing copolymer as claimed in claim 1.

* * * * *